3,600,454
GAS-LIQUID CONTACTING USING SILICONE ANTIFOAMING AGENT IN BUTADIENE EXTRACTION
Pannalal Sohanlal Jhawar, Stockton-on-Tees, England, assignor to Imperial Chemical Industries Limited, London, England
No Drawing. Filed Oct. 10, 1969, Ser. No. 865,509
Claims priority, application Great Britain, Oct. 14, 1968, 48,618/68
Int. Cl. B01d *3/40;* C07c *7/08, 11/16*
U.S. Cl. 260—681.5
12 Claims

ABSTRACT OF THE DISCLOSURE

Gases, for example mixtures of hydrocarbons, are contacted with a liquid selected from dimethylformamide, dimethylacetamide and saturated heterocyclic compounds having 5- or 6-membered rings in which the hetero atom is oxygen or nitrogen, for example N-methylpyrrolidone, and an antifoaming agent, for example a silicone. The process reduces foaming in processes such as the solvent extraction of butadiene, allowing increased extraction rates.

---

This invention relates to the contacting of gases with liquids.

Gases and liquids are contacted in chemical plant in numerous different circumstances, for example in reactions of gases with liquids and in processes involving the absorption of gases in liquid or the expulsion of gases from solution in liquid solvents. In other operations, gases may be generated in situ in liquid media. In all these situations, when certain liquids are employed the effective capacity of the equipment in which the operation is carried out may be limited by expansion of the gas-liquid "mixture" caused by the formation of stable bubbles of gas in the liquid.

The present invention has as an object the more efficient use of plant volume when gases are contacted with such liquids.

Accordingly, the present invention is a process for contacting a gas with a liquid characterised in that the liquid contains dimethylformamide, dimethylacetamide or a saturated heterocyclic compound having a 5- or 6-membered ring in which the hetero atom is oxygen or nitrogen, and an anti-foaming agent.

Saturated heterocyclic compounds suitable for use in the process of the invention may be substituted or unsubstituted. Particularly suitable heterocyclic compounds are saturated lactones with 4 or 5 carbon atoms in the ring, and compounds in which the nitrogen hetero atom is either unsubstituted or substituted with one or more alkyl or hydroxy alkyl groups. Examples of the heterocyclic compounds are butyrolactone, pyrrolidone and piperidone.

It is preferred that the liquid used in the process of the invention should be a saturated heterocyclic compound having a 5-membered ring in which the hetero atom is nitrogen, for example a lactam or more preferably an N-alkyl substituted or N-hydroxy alkyl substituted lactam, for example N-methyl pyrrolidone, N-butyl pyrrolidone, N-formyl pyrrolidone, and N-($\beta$-hydroxyethyl)-pyrrolidone. The preferred liquid is N-methyl pyrrolidone. Other suitable solvents are N-alkyl substituted cyclic imides, for example N-methyl succinimide and N-methyl glutarimide.

The process of the invention is applicable to any process involving a gas and a liquid of the types described but is directed in particular to gas-liquid reactions and gas-liquid solvent extraction processes. The gas may be mechanically introduced into the liquid, for example by counter-current flow through the liquid or by bubbling through the liquid, or it may be generated in situ within the liquid, for example as a result of a chemical reaction forming the gas or in such operations as distillation.

It is preferred to contact the gas counter-currently with the liquid.

Gases suitable for use in the process include inorganic gases for example air, oxygen, nitrogen, the halogen gases, carbon monoxide and carbon dioxide, and gases which are essentially organic in nature, the vapours of organic compounds, for example carbon tetrachloride, chloroform and alcohols, and hydrocarbons.

The process of the invention is particularly suitable for the solvent extraction of hydrocarbons of the same or different classes from each other, for example the separation of olefines from olefines, aromatic compounds from aliphatic compounds, acetylenic compounds from olefines, dienes from olefines, and olefines from paraffins.

A particular form of the invention is a process for recovering a hydrocarbon from a mixture containing it which comprises contacting the mixture with a liquid in which the hydrocarbon has a greater or lesser solubility than other components of the mixture and which contains or consists of dimethylformamide, dimethylacetamide, or a saturated heterocyclic compound having a 5- or 6-membered ring in which the hetero atom is oxygen or nitrogen, and with an antifoaming agent.

Preferably the hydrocarbon is a diene or conjugated diene and more preferably is butadiene which is in a $C_4$-olefine and diolefines mixture.

A further particular form of the invention is a process for recovering butadiene from a mixture containing it which comprises contacting the butadiene-containing mixture with N-methyl pyrrolidone and with an anti-foaming agent.

A wide variety of antifoaming agents may be used in the process of the invention in its various forms including fatty acids, fatty acid esters for example esters of stearic acid and oleic acid, castor oil, pine oil, organic phosphates for example tributyl phosphate, metallic soaps and silicones. Preferably the anti-foaming agent is a silicone, more preferably a polydimethyl siloxane. The silicone may be pure or it may comprise a mixture of a silicone with another material, for example a dispersing agent. When such a mixture is used as the anti-foaming agent, the silicone may constitute as low as 5% by weight of the mixture but preferably the mixture contains at least 10% by weight of silicone.

The antifoaming agent may be used in amounts of up to 1000 p.p.m. based on the weight of liquid, present, but it is preferred that amounts in the range 1 to 250 p.p.m. are used.

The antifoaming agent may be added to the liquid used to contact the gas either directly or in solution in a suitable solvent, for example a hydrocarbon. It is preferred that the hydrocarbon solvent should be the same hydrocarbon as the gas which is being contacted. Suitable hydrocarbon solvents include benzene, xylene, butene, butadiene. Aromasol H (registered trademark) and butene-butadiene mixtures. If desired, the antifoaming agent may be added to the process after the gas and liquid have been contacted. In such a case, foam may already have formed and we have found that addition of an antifoaming agent at this point reduces the amount of foam.

In the particular form of the invention for recovering butadiene from a mixture containing it by contact with N-methyl pyrrolidone and with an antifoaming agent, it is preferred that the N-methyl pyrrolidone should contain up to 25% by weight of water, more preferably 1 to 10% by weight of water. The preferred antifoaming agent in this particular form of the invention is a polydimethyl siloxane, preferably one whose viscosity is in the range 20 to 1000 centistokes at 25° C., more preferably 50 to 500 centistokes at 25° C. This particular form of the invention is preferably operated at elevated pressures up to 100 p.s.i.g., more preferably at pressures in the range 20 to 60 p.s.i.g.

By reducing foaming which would otherwise occur, the present invention increases considerably the operating efficiency of gas-liquid contact processing for example processes for the manufacture of butadiene which utilise N-methyl pyrrolidone as the extractive solvent for the butadiene.

The following examples illustrate further the process of the invention.

EXAMPLE 1

A $C_4$-olefin and diolefins stream was contacted countercurrently at room temperature with N-methyl pyrrolidone in a laboratory Odershaw column of 15 trays. The $C_4$-olefin and diolefins stream had a composition as follows: 40% butadiene-1,3, 25.5% isobutene, 16% butene-1, 10.8% butene-2, 6.1% butanes and 1.6% of minor components, for example $C_4$-acetylenes, methylacetylene and $C_5$-hydrocarbons. The N-methyl pyrrolidone was circulated continuously round the column until it was saturated with $C_4$ hydrocarbons, but the hydrocarbon stream was used on a "once-through" basis only. The hydrocarbon stream was passed through the column at a gas rate of 300 litres per hour. The N-methyl pyrrolidone was circulated at a rate of 5.5 litres per hour of aqueous N-methyl pyrrolidone. When the N-methyl pyrrolidone had become saturated, the height of foam formed was 2 cm. 100 p.p.m., based on the weight of N-methyl pyrrolidone, of an antifoaming agent Silicone F111/300, which is a pure silicone of the polydimethyl siloxane type having a viscosity at 20° C., of 300 centistokes, was added to the foaming mixture, the height of the foam being thereby reduced to 1.16 cm.

EXAMPLE 2

Example 1 was repeated except that the antifoaming agent added was 100 p.p.m. of Silcolapse 5000. This agent is a silicone fluid in a dispersing agent, there being 30% by weight of silicone present. Addition of this agent reduced the height of the foam from 2 cm. to 1.16 cm.

EXAMPLE 3

A $C_4$-olefine and diolefins stream of the same composition as that used in Example 1 was contacted counter-urrently with N-methyl pyrrolidone containing about 5% water in a plant for the manufacture of butadiene. In the absence of an antifoaming agent the maximum feed rate of the olefin stream which could be obtained for satisfactory operation of the plant was 12½ tons per hour.

When the antifoaming agent Silicone F111/300 was present in the N-methyl pyrrolidone at a concentration of about 10 p.p.m., the maximum feed rate of the olefin stream which could be obtained was 23 tons per hour.

I claim:
1. A process for extracting a hydrocarbon from a gaseous mixture of hydrocarbons which comprises contacting the gaseous mixture with a liquid containing a compound selected from the group consisting of dimethylformamide, dimethylacetamide, and a sautrated heterocyclic compound having 5- or 6-membered rings in which the hetero atom is nitrogen, and an antifoaming agent comprising a polydimethylsiloxane.

2. A process as claimed in claim 1 in which the saturated heterocyclic compound is a lactam.

3. A process as claimed in claim 1 in which the saturated heterocyclic compound is N-methyl pyrrolidone.

4. A process as claimed in claim 1 in which the gas is contacted countercurrently with the liquid.

5. A process as claimed in claim 1 in which the gas is generated in situ within the liquid.

6. A process as claimed in claim 1 in which the antifoam is added in solution in a hydrocarbon to the liquid used to contact the gas.

7. A process as claimed in claim 6 in which the hydrocarbon solvent is the same hydrocarbon as the gas being contacted.

8. A process as claimed in claim 1 in which the mixture of hydrocarbons comprises a $C_4$ olefine and butadiene.

9. A process as claimed in claim 8 in which the liquid comprises N-methyl pyrrolidone and an antifoaming agent.

10. A process as claimed in claim 1 for recovering butadiene from a $C_4$ olefin and diolefins stream containing butadiene which comprises contacting the stream with N-methyl pyrrolidone and 1 to 250 p.p.m., based on the weight of N-methyl pyrrolidone, of a polydimethylsiloxane which has a viscosity at 25° C. in the range 50 to 500 centistokes.

11. A process as claimed in claim 1 in which 1 to 250 p.p.m. polydimethylsiloxane are present based on the weight of liquid present.

12. A process as claimed in claim 1 in which the polydimethylsiloxane has a viscosity in the range 50 to 500 centistokes at 25° C.

References Cited
UNITED STATES PATENTS

| | | | |
|---|---|---|---|
| 2,983,685 | 5/1961 | Harbin | 55—87X |
| 3,320,138 | 5/1967 | Brandt et al. | 260—681.5X |
| 3,496,069 | 2/1970 | Tschopp et al. | 260—681.5X |
| 2,373,951 | 4/1945 | Evans et al. | 55—87 |
| 3,264,365 | 8/1966 | Luken | 260—683.3 |
| 2,748,180 | 5/1956 | Webber | 260—683.3 |

OTHER REFERENCES

Kouloheris, "Foam Destruction and Inhibition," Chemical Engineering, pp. 143–146 (July 27, 1970).

DELBERT E. GANTZ, Primary Examiner

G. E. SCHMITKONS, Assistant Examiner

U.S. Cl. X.R.

55—87; 203—58, 59; 208—322, 323; 260—681.5R, 683.3